United States Patent
Srivastava et al.

(10) Patent No.: US 10,582,435 B2
(45) Date of Patent: Mar. 3, 2020

(54) METHOD AND SYSTEM FOR HANDLING WIRELESS COMMUNICATION IN VOICE OVER WIRELESS FIDELITY SYSTEM

(71) Applicant: SAMSUNG ELECTRONICS CO., LTD., Suwon-si (KR)

(72) Inventors: Sandesh Kumar Srivastava, Bangalore (IN); Harikrishnan Natarajan, Bangalore (IN); Suneel Kumar Parmeshwar Diggi, Bangalore (IN); Hong-Shik Kim, Seoul (KR); Madhan Raj Kanagarathinam, Bangalore (IN); Siva Naga Kumar Venkata Atmakuri, Bangalore (IN); Sung-In Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/047,777

(22) Filed: Jul. 27, 2018

(65) Prior Publication Data
US 2019/0037465 A1  Jan. 31, 2019

(30) Foreign Application Priority Data

Jul. 28, 2017 (IN) .............. 201741026945
Jul. 9, 2018 (IN) .............. 201741026945

(51) Int. Cl.
*H04W 36/30* (2009.01)
*H04B 17/382* (2015.01)
(Continued)

(52) U.S. Cl.
CPC .......... *H04W 36/30* (2013.01); *H04B 17/318* (2015.01); *H04B 17/382* (2015.01); *H04W 36/0022* (2013.01); *H04W 36/12* (2013.01)

(58) Field of Classification Search
CPC . H04W 36/30; H04W 36/12; H04W 36/0022; H04W 48/16; H04W 48/06;
(Continued)

(56) References Cited

U.S. PATENT DOCUMENTS

2006/0111112 A1 * 5/2006 Maveddat .............. H04W 8/02
455/439
2008/0165735 A1  7/2008 Chen et al.
(Continued)

FOREIGN PATENT DOCUMENTS

WO  2017/167701 A1  10/2017

*Primary Examiner* — Jung Liu
(74) *Attorney, Agent, or Firm* — Sughrue Mion, PLLC

(57) ABSTRACT

A method and system for handling a wireless communication in a Voice over Wireless Fidelity (VoWiFi) system including a plurality of nodes is provided. The method includes detecting, by a VoWiFi controller, a wireless connection between an electronic device and a first node from among the plurality of nodes; determining, by the VoWiFi controller, a performance of each of the plurality of nodes; detecting, by the VoWiFi controller, that a first performance of the first node is less than a second performance of a second node from among the plurality of nodes; and performing, by the VoWiFi controller, a handover of the electronic device from the first node to the second node.

18 Claims, 10 Drawing Sheets

(51) Int. Cl.
  *H04B 17/318* (2015.01)
  *H04W 36/00* (2009.01)
  *H04W 36/12* (2009.01)
(58) Field of Classification Search
  CPC ............. H04W 76/30; H04W 36/0085; H04W 36/165; H04W 76/19; H04W 92/02; H04W 84/12; H04B 17/382; H04B 17/318
  See application file for complete search history.

(56) References Cited

U.S. PATENT DOCUMENTS

| | | | |
|---|---|---|---|
| 2010/0232389 A1 | 9/2010 | Park | |
| 2014/0269614 A1 | 9/2014 | Maguire et al. | |
| 2015/0350983 A1* | 12/2015 | Kwok | H04L 65/1069 370/331 |
| 2016/0234727 A1 | 8/2016 | Sridhar et al. | |
| 2017/0180429 A1* | 6/2017 | Osterlund | H04L 65/1006 |
| 2017/0317939 A1* | 11/2017 | Karlsson | H04L 47/24 |
| 2018/0063764 A1* | 3/2018 | Bollapalli | H04W 76/10 |
| 2018/0206153 A1* | 7/2018 | Qu | H04W 36/0022 |
| 2018/0262433 A1* | 9/2018 | Ouyang | H04L 47/2416 |
| 2019/0014519 A1* | 1/2019 | Brown | H04W 76/16 |
| 2019/0037339 A1* | 1/2019 | Liu | H04L 12/1407 |
| 2019/0037617 A1* | 1/2019 | Kapatralla | H04W 76/11 |
| 2019/0110236 A1* | 4/2019 | Huang | H04W 36/14 |
| 2019/0116540 A1* | 4/2019 | Faus Gregori | H04W 36/0038 |
| 2019/0124559 A1* | 4/2019 | Brown | H04W 36/0022 |
| 2019/0159160 A1* | 5/2019 | Albasheir | H04W 64/00 |
| 2019/0230132 A1* | 7/2019 | Brown | H04L 65/1036 |

\* cited by examiner

METHOD AND SYSTEM FOR HANDLING WIRELESS COMMUNICATION IN VOICE OVER WIRELESS FIDELITY SYSTEM

CROSS-REFERENCE TO RELATED APPLICATION(S)

This application is based on and claims priority under 35 U.S.C. § 119 to Indian Provisional Patent Application No. 201741026945, filed on Jul. 28, 2017, and Indian Complete Patent Application No. 201741026945, filed on Jul. 9, 2018, in the Indian Patent Office, the disclosures of which are incorporated by reference herein in their entirety.

BACKGROUND

1. Field

The present disclosure relates to a wireless communication system, specifically to a method and system for handling a wireless communication in a Voice over Wireless Fidelity (VoWiFi) system.

2. Description of Related Art

Voice over Long Term Evolution (VoLTE) has been widely accepted as the standard mechanism for delivering voice services over an IP Multimedia Subsystem (IMS). Voice over Wi-Fi (VoWiFi) complements VoLTE. Both rely on the IMS framework as a backbone. VoWiFi extends the scope of VoLTE scope to Wi-Fi. The demand for VoWiFi solutions has increased based on benefits to both users of an electronic device (e.g., smartphone, laptop or the like) and mobile operators. A user of an electronic device obtains a better service experience even in indoor and low mobile coverage areas without compromising security. For example, the VoWiFi is operated based on a subscriber identity module (SIM) credential authentication. Mobile operators can expand their customer base to remote areas and gain an edge over existing VoIP solutions by offering VoWiFi services which include security.

FIG. 1 illustrates a call drop scenario during a VoWiFi to VoWiFi (W2W) handover scenario, according to the related art. In FIG. 1, the electronic device 100 is not within an LTE coverage area 300.

The transition between these complementary services of the VoLTE and the VoWiFi is referred to as handover and conventionally represented as VoLTE to VoWiFi (i.e., L2W) and VoWiFi to VoLTE (i.e., W2L). The trigger point for the handovers is determined by the electronic device 100 based on certain parameters. In an example for a typical electronic device 100, the handover criterion is Wi-Fi Received Signal Strength Indicator (RSSI) signal strength alone. However, some solutions propose using other parameters like Real-Time Transport Protocol (RTP) packet loss rate, jitter (a measure of variability of observed packet timing in the context of RTP), or round trip delay. Even though L2W and W2L handovers are addressed in some current implementations, there is no solution available for VoWiFi to VoWiFi (W2W) handovers. Hence, if the user of the electronic device 100 moves from a coverage area of one Wi-Fi Access Point (AP) 200a to another Wi-Fi AP 200b, the current implementations try to perform the W2L and L2W handover instead of a direct W2W handover. In FIG. 1, electronic device 100 is not geographically within LTE coverage area 300. Since VoWiFi is intended to extend benefits of VoLTE to the user of the electronic device 100 when cellular coverage is poor or absent, requiring handover to an LTE base station (the current handover logic) fails to ensure a seamless user experience in some circumstances. The dropped connection of FIG. 1 includes disruption IMS services relied on by electronic device 100.

This related art handover approach lacks ability to address a wide range of issues which are listed as follows:

a) The VoWiFi to VoWiFi seamless handover is not feasible at places with no LTE coverage (for example, outside area 300 of FIG. 1). This is a severe shortcoming of existing methods. In the existing methods a break in an IMS session can occur whenever the LTE coverage area 300 is not available. Then, the IMS session needs to be re-established after electronic device 100 re-establishes a Wi-Fi connection. The call drop causes disruption in the IMS services. A disruption in IMS services can disrupt an active VoWiFi call; causing a bad experience for the user of the electronic device 100.

b) Poor user experience in a low LTE coverage area 300: In areas of low LTE coverage such as cell boundary regions, there may not be complete disruption of the IMS services. However, a user experience can be seriously impacted during the transition to LTE caused by multiple retransmissions, packet loss, and long mute events during a call. Typically, electronic device 100 has a mechanism to perform some basic performance checks before connecting to Wi-Fi. The basic performance checks cause delay in switching back to the VoWiFi from VoLTE, the delay results in a poor user experience.

c) Multiple handovers performed during VoWiFi-VoWiFi transition: By performing handover to the VoLTE, the number of handovers in current implementations is almost twice the number actually required. Since handover is an expensive operation in terms of the signaling bandwidth and involving resources at the electronic device 100 and network to be released and reallocated, excessive handover events correspond to a poor design and implementation.

d) Session break for all apps performing networking operation: Multiple session breaks for apps a generic problem observed in apps using some networking and not only related to the IMS sessions. Whenever, the electronic device 100 moves from the Wi-Fi to the LTE to Wi-Fi, applications listening for networking broadcasts will receive multiple connection and disconnection indications.

In the existing related art methods, handover signaling activity has been carried within the IMS call handover context. There is a challenge to effectively address the underlying problem for any network architecture. On the other hand, there has been quite a lot of research in terms of heterogeneous handover decisions. In an example, many mechanisms have been presented regarding the probe-and-decision phase to reduce the original IEEE 802.11 probe latency from hundreds of milliseconds to tens of milliseconds (or even less). These mechanisms include guidelines for handoff schemes based on factors affecting overall handoff latency, use of neighbor graphs and non-overlap graphs to reduce total number of probed channels and total time spent waiting on each channel and to reduce scanning delay by selective channel scanning for fast handoff. In another existing method, a handoff procedure utilizes a selective scanning mechanism and a caching mechanism, which reduces a medium access control (MAC) layer handoff latency and selective neighbor caching scheme for handoff between the Wi-Fi access points (APs) 200a and 200b. The related art has not addressed VoWiFi-VoWiFi problems.

Thus, it is desired to address the above mentioned disadvantages or other shortcomings or at least provide a useful alternative.

SUMMARY

Provided are a method and an electronic device for handling a wireless communication in a VoWiFi system.

In accordance with an aspect of the disclosure, a performance of each of nodes (i.e., Wi-Fi AP and LTE AP) is determined in the VoWiFi system.

In accordance with an aspect of the disclosure, a performance of each of nodes in the VoWiFi system is determined based on a Socio VoWiFi metric.

In accordance with an aspect of the disclosure, a performance of each of nodes in the VoWiFi system is determined based on a Cross Layer Enhanced Handover (CLEH) metric.

In accordance with an aspect of the disclosure, a performance of a first node from the plurality of nodes is detected to be is less than a performance of a second node from the plurality of nodes.

In accordance with an aspect of the disclosure, a persevered IPSec tunnel from a wireless interface associated with the first node is transferred to a wireless interface associated with the second node.

In accordance with an aspect of the disclosure, the handover of the electronic device from the first node to the second node is performed.

In accordance with an aspect of the disclosure, the handover of the electronic device from the first node to the second node is performed without dropping a VoWiFi service (e.g., VoWiFi call).

In accordance with an aspect of the disclosure, the handover of the electronic device from the first node to the second node is performed without transitioning to a VoLTE compulsorily.

In accordance with an aspect of the disclosure, the handover of the electronic device from the first node to the second node is performed by providing a fast and efficient reselection mechanism for a network selection of an IMS session.

Additional aspects will be set forth in part in the description which follows and, in part, will be apparent from the description, or may be learned by practice of the presented embodiments.

In accordance with an aspect of the disclosure, there is provided a method for handling a wireless communication in a Voice over Wireless Fidelity (VoWiFi) system including a plurality of nodes, the method including: detecting, by a VoWiFi controller, a wireless connection between an electronic device and a first node from among the plurality of nodes; determining, by the VoWiFi controller, a performance of each of the plurality of nodes; detecting, by the VoWiFi controller, that a first performance of the first node is less than a second performance of a second node from among the plurality of nodes; and performing, by the VoWiFi controller, a handover of the electronic device from the first node to the second node.

The performing the handover of the electronic device from the first node to the second node may include: detecting an Internet protocol security (IPSec) tunnel between the electronic device and a wireless interface associated with the first node; preserving the IPSec tunnel for a time period; and performing the handover by switching the electronic device from the first node to the second node by transferring the preserved IPSec tunnel from the wireless interface associated with the first node to a wireless interface associated with the second node.

The preserved IPSec tunnel may be transferred from the wireless interface associated with the first node to the wireless interface associated with the second node using routing commands.

A wireless interface associated with the first node may be bounded to the wireless interface associated with the second node based on a Real-simultaneous dual-band (RSDB) capability.

The first node may be a Wi-Fi access point and a second node is a second Wi-Fi access point.

The first node may be a Wi-Fi access point and a second node may be a Long

Term Evolution (LTE) access point.

The determining the performance of each of the nodes may include: determining a Socio VoWiFi metric for each of the nodes based on a plurality of socio parameters associated with each of the nodes; and determining the performance of each of the nodes based on the Socio VoWiFi metric.

The plurality of socio parameters may include social activities, connection status, quality parameters, and a growth poll period.

The social activities may include time of user activity, and location of user activity.

The determining the performance of each of the nodes may include:

determining a Cross Layer Enhanced Handover (CLEH) metric for each of the nodes based on a plurality of CLEH parameters; and determining the performance of each of the nodes based on the CLEH metric.

The plurality of CLEH parameters may include at least one of a Wi-Fi Received Signal Strength Indicator (RSSI), a Long Term Evolution (LTE) Reference Signal Received Power (RSRP), Reference Signal Received Quality (RSRQ), and an Internet Protocol (IP) Multimedia Subsystem (IMS) registration state.

In accordance with an aspect of the disclosure, there is provided a method for handling a wireless communication in a Voice over Wireless Fidelity (VoWiFi) system including a plurality of nodes, the method including: detecting, by a VoWiFi controller, a VoWiFi call between an electronic device and a first node from among the plurality of nodes; determining, by the VoWiFi controller, that a handover of the electronic device from the first node to a second node from among the plurality of nodes needs to be performed to avoid dropping the VoWiFi call; and performing, by the VoWiFi controller, the handover of the electronic device from the first node to the second node.

The determining may include: determining a performance of each of the nodes; and detecting that a performance of the first node is less than a performance of the second node.

The performing the handover may include: detecting an Internet protocol security (IPSec) tunnel between the electronic device and a wireless interface associated with the first node; preserving the IPSec tunnel for a time period; and performing the handover by switching the electronic device from the first node to the second node by transferring the preserved IPSec tunnel from the wireless interface associated with the first node to a wireless interface associated with the second node.

The preserved IPSec tunnel may be transferred from the wireless interface associated with the first node to the wireless interface associated with the second node using routing commands.

A wireless interface associated with the first node may be bounded to the wireless interface associated with the second node based on a Real-simultaneous dual-band (RSDB) capability.

The determining the performance of each of the nodes may include: determining a Socio VoWiFi metric for each of the nodes based on a plurality of socio parameters associated with each of the nodes; and determining the performance of each of the nodes based on the Socio VoWiFi metric.

The plurality of socio parameters may include social activities, connection status, quality parameters, and a growth poll period.

The social activities may include time of user activity, and location of user activity.

The determining the performance of each of the nodes may include: determining a Cross Layer Enhanced Handover (CLEH) metric for each of the nodes based on a plurality of CLEH parameters; and determining the performance of each of the nodes based on the CLEH metric.

The plurality of CLEH parameters may include at least one of a Wi-Fi Received Signal Strength Indicator (RSSI), a Long Term Evolution (LTE) Reference Signal Received Power (RSRP), Reference Signal Received Quality (RSRQ), and an Internet Protocol (IP) Multimedia Subsystem (IMS) registration state.

In accordance with an aspect of the disclosure, there is provided an electronic device for handling a wireless communication in a Voice over Wireless Fidelity (VoWiFi) system including a plurality of nodes, the electronic device including: a memory; a processor; and a VoWiFi controller coupled to the memory and the processor, then VoWiFi controller being configured to: detect a wireless connection between the electronic device and a first node from among the plurality of nodes, determine a performance of each of the nodes, detect that a performance of the first node is less than a performance of a second node from among the plurality of nodes, and perform a handover of the electronic device from the first node to the second node.

The VoWiFi controller may be further configured to perform the handover by: detecting an Internet protocol security (IPSec) tunnel between the electronic device and a wireless interface associated with the first node; preserving the IPSec tunnel for a time period; and performing the handover by switching the electronic device from the first node to the second node by transferring the preserved IPSec tunnel from the wireless interface associated with the first node to a wireless interface associated with the second node.

The VoWiFi controller may be further configured to use routing commands to transfer the preserved IPSec tunnel from the wireless interface associated with the first node to the wireless interface associated with the second node.

The wireless interface associated with the first node may be bounded to the wireless interface associated with the second node based on a Real-simultaneous dual-band (RSDB) capability.

The first node may be a Wi-Fi access point and a second node may be a second Wi-Fi access point.

The first node may be a Wi-Fi access point and a second node may be a Long Term Evolution (LTE) access point.

The VoWiFi controller may be further configured to determine the performance of each of the nodes by: determining a Socio VoWiFi metric for each of the nodes based on a plurality of Socio parameters associated with each of the nodes; and determining the performance of each of the nodes based on the Socio VoWiFi metric.

The plurality of socio parameters may include social activities, connection status, quality parameters, and a growth poll period.

The social activities may include a time of user activity, and a location of user activity.

The VoWiFi controller may be further configured to determine the performance of each of the nodes by: determining a Cross Layer Enhanced Handover (CLEH) metric for each of the nodes based on a plurality of CLEH parameters; and determining the performance of each of the nodes based on the CLEH metric.

The plurality of CLEH parameters may include at least one of a WiFi Received Signal Strength Indicator (RSSI), a Long Term Evolution (LTE Reference Signal Received Power (RSRP), Reference Signal Received Quality (RSRQ), and an Internet Protocol (IP) Multimedia Subsystem (IMS) registration state.

In accordance with an aspect of the disclosure, there is provided an electronic device for handling a wireless communication in a Voice over Wireless Fidelity (VoWiFi) system including a plurality of nodes, the electronic device including: a memory; a processor; and a VoWiFi controller coupled to the memory and the processor, the VoWiFi controller being configured to: detect a VoWiFi call between the electronic device and a first node from the plurality of nodes, determine that a handover of the electronic device from the first node to a second node from the plurality of nodes needs to be performed to avoid a VoWiFi call drop, and perform the handover of the electronic device from the first node to the second node.

The VoWiFi controller may be further configured to determine that the handover needs to be performed by: determining a performance of each of the nodes; and detecting that a performance of the first node is less than a performance of the second node, wherein the plurality of nodes may include the second node.

The VoWiFi controller may be further configured to perform the handover by: detecting an Internet protocol security (IPSec) tunnel between the electronic device and a wireless interface associated with the first node; preserving the IPSec tunnel for a time period; and performing the handover by switching from of the electronic device from the first node to the second node by transferring the preserved IPSec tunnel from the wireless interface associated with the first node to a wireless interface associated with the second node.

The VoWiFi controller may be further configured to transfer the preserved IPSec tunnel using routing commands.

The wireless interface associated with the first node is bounded to the wireless interface associated with the second node based on a Real-simultaneous dual-band (RSDB) capability.

The VoWiFi controller may be further configured to determine the performance of each of the nodes by: determining a Socio VoWiFi metric for each of the nodes based on a plurality of socio parameters associated with each of the nodes; and determining the performance of each of the nodes based on the Socio VoWiFi metric.

The plurality of socio parameters may include social activities, connection status, quality parameters, and a growth poll period.

The social activities may include time of user activity and location of user activity.

The VoWiFi controller may be further configured to determine the performance of each of the nodes by: determining a Cross Layer Enhanced Handover (CLEH) metric for each of the nodes based on a plurality of CLEH parameters; and determining the performance of each of the nodes based on the CLEH metric.

The plurality of CLEH parameters may include at least one of a Wi-Fi Received Signal Strength Indicator (RSSI), a Long Term Evolution (LTE) Reference Signal Received Power (RSRP), Reference Signal Received Quality (RSRQ), and an Internet Protocol (IP) Multimedia Subsystem (IMS) registration state.

Also disclosed herein is an electronic device for handling a wireless communication in a Voice over Wireless Fidelity (VoWiFi) system comprising a plurality of nodes, the electronic device including: a memory, a processor and a VoWiFi controller. The VoWiFi controller is configured to: detect a wireless connection between the electronic device and a first node from the plurality of nodes, determine a performance of each of the nodes, detect that a performance of the first node is less than a performance of a second node from the plurality of nodes, and perform handover of the electronic device from the first node to the second node.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
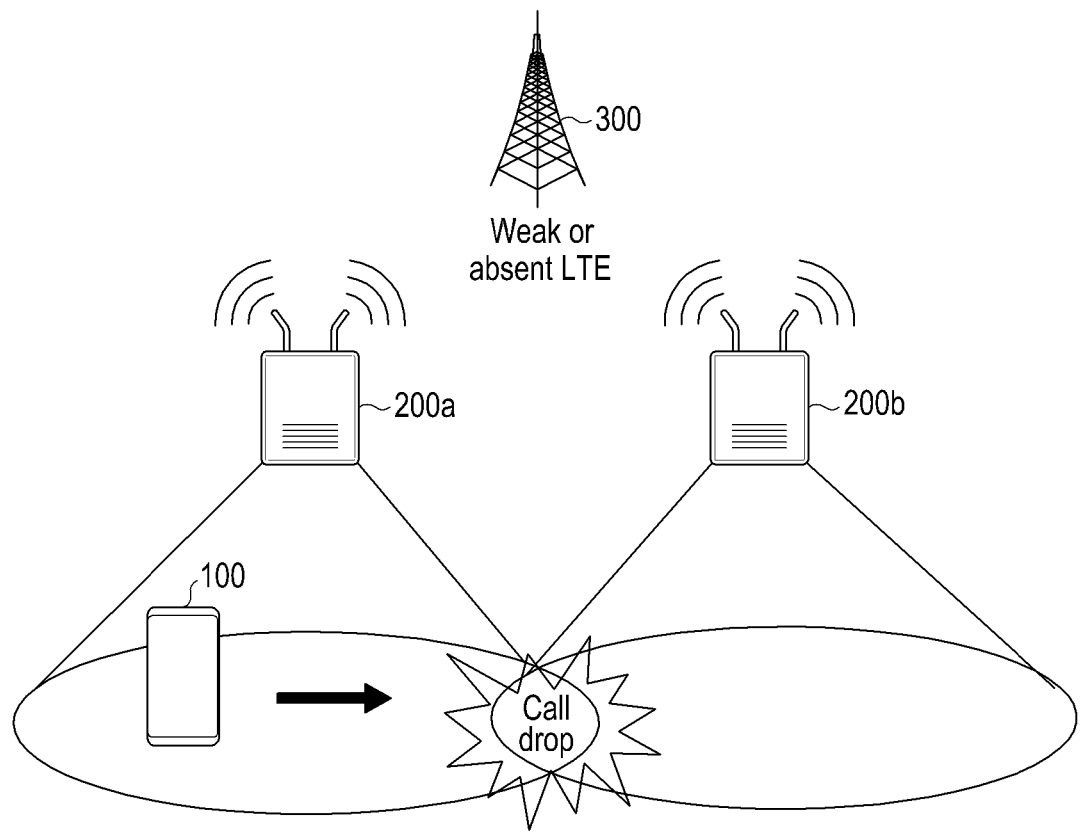
FIG. 1 illustrates a call drop event during a W2W handover scenario, according to the related art.

Embodiments and various features and advantageous details thereof are explained more fully in the following description with reference to the accompanying drawings. Descriptions of well-known components and processing techniques are omitted so as to not unnecessarily obscure the embodiments disclosed herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments disclosed herein can be practiced and to further enable those skilled in the art to practice the embodiments disclosed herein. Accordingly, the examples should not be construed as limiting the scope of the embodiments disclosed herein.

Herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments disclosed herein achieve a method for handling a wireless communication in a VoWiFi system including a plurality of nodes. The method includes detecting, by a VoWiFi controller, a wireless connection between an electronic device and a first node from the plurality of nodes. Further, the method includes determining, by the VoWiFi controller, a performance of each of the nodes. Further, the method includes detecting, by the VoWiFi controller, that a performance of the first node is less than a performance of a second node from the plurality of nodes. Furthermore, the method includes performing, by VoWiFi controller, a handover of the electronic device from the first node to the second node.

Unlike related art methods and systems, the proposed method can be used to handle a wireless communication in the VoWiFi system by providing effective ePDG tunnel establishment and management. The method can be used to perform a handover (i.e., W2W handover) without requiring a transition to VoLTE first. In the proposed methods, re-selection logic is provided for a network selection of an IMS session during the wireless communication in the VoWiFi system. The method can be used to provide a seamless handover with the help of RSDB Wi-Fi and interface bonding.

The method can be used to handle a wireless communication service (e.g., VoWiFi call) in the VoWiFi system under circumstances independent of an LTE coverage. This results in improving Quality of Service (QoS) during the wireless communication service.

The method can be used to remove the dependency of a cellular availability for a handover procedure by providing an IMS session handover from one Wi-Fi AP to another WiFi AP. In some embodiments, the handover is based on a CLEH metric and/or a Socio VoWiFi metric.

The method can be used to handle the wireless communication service in the VoWiFi system a path independent fashion (i.e., irrespective of connected AP/non-connected AP), a network characteristic independent fashion (i.e., different Wi-Fi technologies 802.11X or WiMax, etc.), and be operational feature independent (i.e., for various backhaul arrangements). The method can be used to handle the wireless communication service in the VoWiFi system without change to middleware components in the electronic device.

The proposed method can be used to provide an ePDG tunnel management in a no service area and no LTE coverage area. This results in handling the wireless communication service in the VoWiFi system in an effective manner and improves the user experience. Note that an ePDG tunnel is different from a Data VPN tunnel.

The method can be used to provide a cross layer based handover for IMS calls. The proposed method can be used to provide the VoWiFi to VoWiFi handover (this is different from Wi-Fi to Wi-Fi data handover) involving RTP and other machine learning approaches.

The method can be used to reduce a mute duration during the handover procedure and reduce the number of connectivity change handovers. This results in a better user experience. The method can be used to handle the wireless communication service in the VoWiFi system by utilizing RSDB (i.e., STA+STA architecture) and tunnel management in a single STA multi Wi-Fi configuration.

Figure 2:
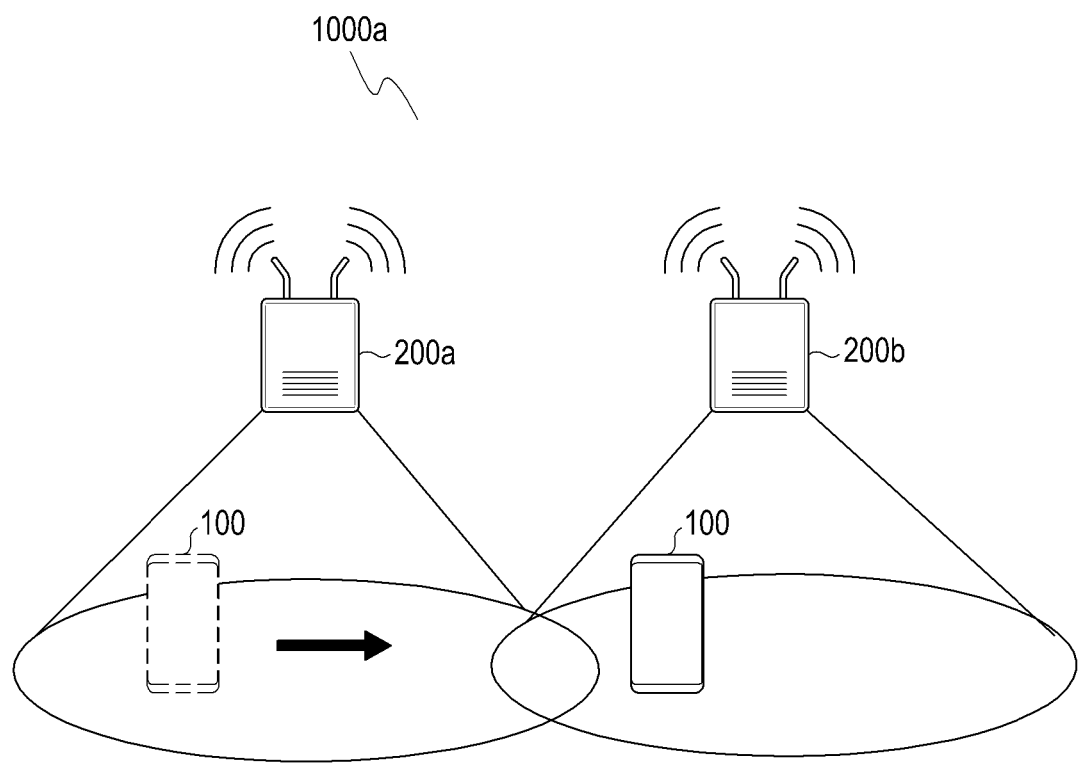
FIG. 2 is an overview of a VoWiFi system for handling a wireless communication during a W2W handover scenario, according to an embodiment.
Figure 3:
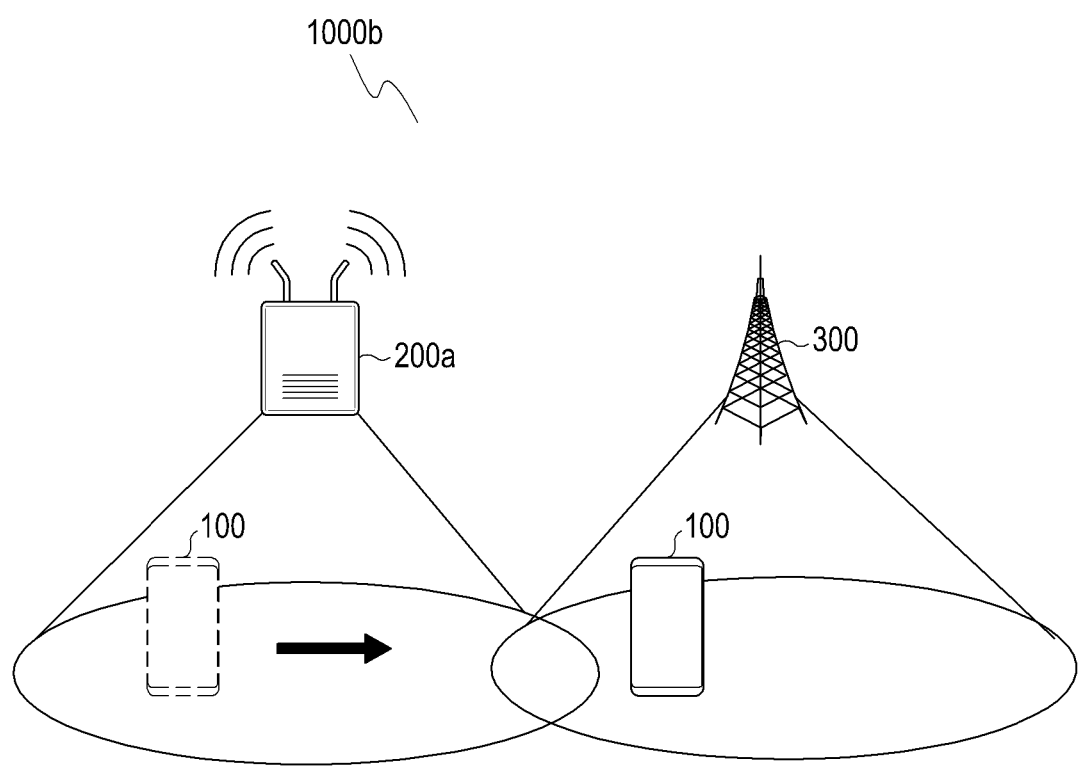
FIG. 3 is another overview of the VoWiFi system for handling the wireless communication during a W2L handover scenario, according to an embodiment.

FIG. 2 is an overview of a VoWiFi system 1000a for handling a wireless communication during a W2W handover scenario, according to embodiments disclosed herein. In an embodiment, the VoWiFi system 1000a includes an electronic device 100 and a plurality of nodes for example, a first node 200a and a second node 200b). In an embodiment, the first node 200a is a Wi-Fi access point and the second node 200b is a second Wi-Fi access point as shown in the FIG. 2. In another embodiment, the first node 200a is the Wi-Fi access point and the second node 300 is an LTE access point as shown in the FIG. 3. The VoWiFi system 1000b is used to handle the wireless communication during a W2L handover scenario as illustrated in FIG. 3.

The electronic device 100 can be, for example but is not limited to, a cellular phone, a tablet, a smart phone, a laptop, a Personal Digital Assistant (PDA), a global positioning system device, a multimedia device, a video device, a game console, or the like. The electronic device 100 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like.

The electronic device 100 is itself configured to detect a wireless connection between the electronic device 100 and the first node 200a from the plurality of nodes. Further, the electronic device 100 is configured to determine a performance of each of the nodes.

In an embodiment, in order to determine the performance of each of the nodes, the electronic device 100 is configured to determine a Socio VoWiFi metric for each of the nodes based on a plurality of socio parameters associated with each of the nodes and determine the performance of each of the nodes based on the Socio VoWiFi metric.

In an embodiment, the plurality of socio parameters comprise social activities, connection status, quality parameters, and a growth poll period. The social activities comprise time, location, and user activity. The quality parameters comprise time, location, and user activity.

In an example, the electronic device 100 is configured to determine the Socio VoWiFi metric based on the equation (1).

$$\delta_i = \beta_i((\tfrac{3}{4} \cdot \alpha_i) + (\tfrac{1}{4} \cdot \gamma_i)) \quad (1)$$

where $\alpha i$ represents a Social DB score, $\beta i$ represents connected status, $\gamma i$ represents quality parameters score, $\delta i$ represents a Socio VoWiFi score, and GPP represents a growth poll period.

In an example, two Wi-Fi APs are deployed in a subway and a smart phone initiates a VoWiFi call using a first Wi-Fi AP. During the active VoWiFi call, the smart phone performs measurements of $\alpha_i$, $\beta_i$, and $\gamma_i$ and calculates $\delta_i$ which is used to determine or identify the more stable Wi-Fi AP (i.e., first Wi-Fi AP or second Wi-Fi AP) for maintaining the VoWiFi call.

If the performance of the first Wi-Fi AP where VoWiFi call is ongoing is degraded compared to the second Wi-Fi AP for at least a minimum time period of the GPP then, the smart phone initiates the handover procedure based on the Socio VoWiFi metric. This is done to avoid unnecessary handovers due to sudden measurement spikes, measurement variations or measurement uncertainty.

As part of the handover procedure, the proposed method can be used to transfer the IPSec tunnel from a present Wi-Fi interface associated with the first Wi-Fi AP to a new interface associated with the second Wi-Fi AP using routing commands without breaking (for example, without interrupting, without tearing-down) the active tunnel. Once the tunnel is mirrored with the other interface and the call is transferred, then the smart phone starts monitoring the parameters again to maintain VoWiFi call service without call drops.

In a calculation of $\delta_i$, the electronic device 100 can use the social layer coefficient $\alpha_i$ to pull in social activities (e.g., user, event, action or the like).

In another embodiment, in order to determine the performance of each of the nodes, the electronic device 100 is configured to determine a CLEH metric for each of the nodes based on a plurality of CLEH parameters and determine the performance of each of the nodes based on the CLEH metric. The plurality of CLEH parameters includes a Wi-Fi Received Signal Strength Indicator (RSSI), an LTE Reference Signal Received Power (RSRP), Reference Signal Received Quality (RSRQ), and/or an IP Multimedia Subsystem (IMS) registration state.

In an embodiment, the CLEH metric is determined based on the following procedures.

Performance Score Estimation: The performance score (i.e., CLEH metric) which is derived by analyzing various connection parameters dynamically which helps to take the handover decisions. The measurement of these parameter considers the following: a) avoid polling for these values continuously i.e. an event based handling mechanism is required for monitoring, b) minimize overhead in terms of power and performance. Also, avoid call drops induced by of the handover parameter values. Finally, the electronic device 100 is reachable by the IMS/ePDG server. Considering these requirements and the existing methods for the LTE Wi-Fi handover, the method can be used to monitor the following parameters and hence derive a performance score index for handover decisions.

A) Filter Based Bandwidth Estimation: In an embodiment, the electronic device 100 includes a bandwidth estimation logic to determine an estimated bandwidth ($BW_E$). A DCT module keeps track of data Tx/Rx rates, using, for example periodic sampling. The estimated bandwidth $B_i$ at instance i is given by Equation (2):

$$B_i = d_i/(t_i - t_{i-1}) = d_i/\Delta_i \qquad (2)$$

where $d_i$ is the data transferred in a time interval bounded by $t_{i-1}$ and $t_i$, and $\Delta_i$ is a time difference delta.

In the proposed method, the estimated available bandwidth, $B_f$, is modeled as a variable based on a discrete time linear system. Further, the method utilizes a discrete time filter which is obtained by discretizing a continuous low-pass filter using the Tustin approximation. The method uses equation (3).

$$B_l = \left[\frac{\frac{2\tau}{\Delta_i} - 1}{\frac{2\tau}{\Delta_i} + 1} \times (B_{i-1})\right] + \left[\frac{B_i + B_{i-1}}{\frac{2\tau}{\Delta_i} + 1}\right] \qquad (3)$$

where $B_i$ is the filtered measurement of the available bandwidth at time $T_1$ and $1/\tau$ is the cut off frequency. Consider a constant $\alpha_i$ which is written as $$\alpha_i = (2\tau - \Delta_i)/(2\tau + \Delta_i) \qquad (4)$$

Hence, using the constant $\alpha_i$ (3) can be rewritten as, $$B_l = \alpha_i B_{i-1} + (1 - \alpha_i)\left(\frac{B_i + B_{i-1}}{2}\right) \qquad (5)$$

In some embodiments, $\alpha_i$ as $1/21$ (to give more weight to based on previous/existing learning). Hence equation (5) can be rewritten as $$B_l = \frac{20}{21}B_{i-1} + \frac{1}{21}B_i \qquad (6)$$

Further, packet aliasing may occur while using a filter. So, in order to avoid the packet aliasing effect, the method normalizes $B_I$ from a low pass filter output and the Bi to obtain final estimated bandwidth $BW_E$ as follows:

$$\text{norm} = B_i - B_I \qquad (7)$$

$$BW_E = B_1 + g^*\text{norm} \qquad (8)$$

where norm is an error normalization parameter and g is clock granularity used for computing bandwidth measurements. Bandwidth fluctuates widely in mobile wireless conditions, hence, the method introduces parameter norm to cope up with the fluctuations. The value for g is 0.5.

B) Link Capacity Score Determination: Shannon's theorem provides an upper bound of the capacity of a link (C) in bits per second (bps), as a function of the available bandwidth (B) and a signal to noise ratio (SINR) of the link. The theorem can be stated as:

$$C = B^*\log(1 + \text{SINR}) \text{ bits/sec} \qquad (9)$$

Equation 9 can be written in bytes/sec as $$C = B/8^*\log(1 + \text{SINR}) \text{ bytes/sec} \qquad (10)$$

Thus, the throughput or the link capacity is proportional to the available bandwidth B, the average signal power S and inversely proportional to the average noise power N. The channel score $C_i$ for an interface i obtained by merging $B_I$ and C from above equations, can be written as $$C_i = (0.11905 B_{i-1} + 0.00595 B_i)^* \log(1 + \text{SINR}) \qquad (11)$$

C. Cross Layer Score Determination: Impact on RTT and Packet Loss: The throughput (Ti) for an interface i can be approximately derived from round trip time (RTT) and the Probability of Packet loss (P) as follows:

$$T_i = \frac{C \times MSS}{RTT \times \sqrt{P}} \qquad (12)$$

where C is constant proportional to the window and MSS is the maximum segment size. P is calculated from the RTP report (loss rate, jitter, etc.)

D. CLEH Final performance score: The electronic device 100 includes a smart network switch (SNS) module for calculating a score of each interface (for the mobile network from a Radio Interface Layer (RIL) and for the Wi-Fi interface from Wi-Fi state machine calculations). The method, based on the previous learning, converts the channel score Ci and a cross layer score (Ti) as shown in table I. The method uses a weighted average of the channel score Ci, cross layer score (Ti) and the SNS Score (Si) to determine the final score ($CLEH_i$). In an example, the CLEH score for the interface i is given as follows (Equation 13):

$$CLEH_i = \beta S_i + \gamma \max\{50, C_i/3\} + \delta \max\{50, T_i/3\} \qquad (13)$$

TABLE 1

| Throughput (in Kbps) | Score |
|---|---|
| 0-30 | 0 |
| 30-60 | 10 |

TABLE 1-continued

| Throughput (in Kbps) | Score |
|---|---|
| 60-90 | 20 |
| 90-120 | 30 |
| 120-150 | 40 |
| >120 | 50 | where β, γ, and δ are the weighted constants to determine the final score. In the experiment, the β, γ, and δ is chosen as 0.3, 0.2, 0.5 respectively to give more weight to the IMS cross layer parameters.

After determining the performance of each of the nodes, the electronic device 100 is configured to detect that a performance of the first node 200a is less than a performance of the second node 200b from the plurality of nodes. Based on the detection, the electronic device 100 is configured to perform a handover from the first node 200a to the second node 200b.

In some embodiments, after determining the performance of each of the nodes, the electronic device 100 is configured to detect that a performance of the first node 200a is less than a performance of the second node 200b and 300 from the plurality of nodes. Based on the detection, the electronic device 100 is configured to perform a handover from the first node 200a to the second node 200b and 300.

In an embodiment, in order to perform the handover, the electronic device 100 is itself configured to detect an Internet protocol security (IPSec) tunnel established between the electronic device 100 and a wireless interface associated with the first node 200a. Further, the electronic device 100 is itself configured to preserve the IPSec tunnel established between the electronic device 100 and an ePDG associated with the first node 200a for a time period. Further, the electronic device 100 is configured to perform the handover by switching from the first node 200a to the second node 200b by transferring the preserved IPSec tunnel from the wireless interface associated with the first node 200a to the wireless interface associated with the second node 200b.

In an embodiment, the preserved IPSec tunnel is transferred from the wireless interface associated with the first node 200a to the wireless interface associated with the second node 200b using routing commands without breaking the IPsec tunnel.

In an embodiment, the wireless interface associated with the first node 200a is bounded to the wireless interface associated with the second node 200b and 300 using a RSDB. That is, the first node 200a is able to simultaneously communicate securely with the second 200b and an LTE access point 300 using an RSDB capability.

In another embodiment, the electronic device 100 is itself configured to detect a VoWiFi call between the electronic device 100 and the first node 200a from the plurality of nodes. After detection, the electronic device 100 is itself configured to determine that the handover from the first node 200a to the second node 200b from the plurality of nodes needs to be performed to avoid the VoWiFi call drop.

Determining that a handover of the electronic device 100 from the first node 200a to the second node 200b needs to be performed to avoid the VoWiFi call drop is done, in some embodiments, by detecting the wireless connection between the electronic device 100 and the first node 200a, determining a performance of each of the nodes, and detecting that the performance of the first node 200a is less than the performance of the second node 200b.

After determination, the electronic device 100 is configured to perform the handover from the first node to the second node 200b without dropping the VoWiFi call.

For example, the plurality of Wi-Fi APs are deployed in the subway and the electronic device 100 includes a VoWiFi controller (not shown). The VoWiFi controller detects a VoWiFi call established between the electronic device 100 and a first Wi-Fi AP from the plurality of Wi-Fi APs. Further, the VoWiFi controller determines that a handover of the electronic device 100 from the first Wi-Fi AP to a second Wi-Fi AP from the plurality of Wi-Fi AP needs to be performed to avoid the VoWiFi call drop based on at least one of the Socio VoWiFi metric and the CLEH metric. Further, the VoWiFi controller performs the handover of the electronic device 100 from the first Wi-Fi AP to the second Wi-Fi AP without dropping the VoWiFi call.

In another example, the plurality of Wi-Fi APs are deployed in a shopping mall and the VoWiFi controller detects a wireless connection between the electronic device 100 and the first Wi-Fi AP from the plurality of Wi-Fi AP. Further, the VoWiFi controller determines the performance of each of the Wi-Fi APs based on at least one of the Socio VoWiFi metric and the CLEH metric. Further, the VoWiFi controller detects that a performance of the first Wi-Fi AP is less than the performance of the second Wi-Fi AP from the plurality of Wi-Fi APs. Further, the VoWiFi controller performs the handover of the electronic device 100 from the first Wi-Fi AP to the second Wi-Fi AP based on the performance detection.

In yet another example, a plurality of Wi-Fi APs and a plurality of LTE APs are deployed in an elevator and the VoWiFi controller detects the wireless connection between the electronic device 100 and the first Wi-Fi AP from the plurality of Wi-Fi APs. Further, the VoWiFi controller determines the performance of each of the Wi-Fi APs and the LTE APs based on at least one of the Socio VoWiFi metric and the CLEH metric. Further, the VoWiFi controller detects that the performance of the first Wi-Fi AP from the plurality of Wi-Fi APs is less than the performance of the first LTE AP from the plurality of LTE APs. Further, the VoWiFi controller performs the handover of the electronic device 100 from the first Wi-Fi AP to the first LTE AP based on the performance detection.

Another overview of the VoWiFi system 1000b is used for handling the wireless communication during the W2L handover scenario is illustrated in the FIG. 3. The operations and functions of the electronic device 100 is already explained in conjunction with the FIG. 2

Although the FIG. 2 and FIG. 3 show various hardware components of the VoWiFi system 1000a and 1000b but it is to be understood that other embodiments are not limited thereon. In other embodiments, the VoWiFi system 1000a and 1000b may include less or more number of components. Further, the labels or names of the components are used only for illustrative purpose and does not limit the scope of the disclosure. One or more components can be combined together to perform same or substantially similar function to handle the wireless communication in the VoWiFi system VoWiFi system 1000a and 1000b.

Figure 4:
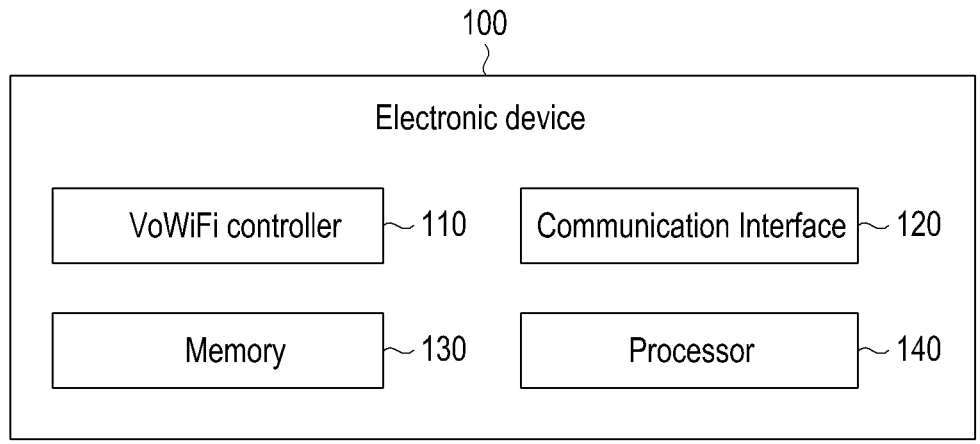
FIG. 4 is a block diagram of an electronic device for performing a handover from a first node to a second node, according to an embodiment.

FIG. 4 is a block diagram of the electronic device 100 for performing the handover from the first node 200a to the second node 200b and 300, according to embodiments as disclosed herein. In an embodiment, the VoWiFi controller 110, a communication interface 120, a memory 130, and a processor 140.

The VoWiFi controller 110 is configured to detect the wireless connection between the electronic device 100 and the first node 200a from the plurality of nodes. Further, the VoWiFi controller 110 is configured to determine the performance of each of the nodes.

In an embodiment, in order to determine the performance of each of the nodes, the VoWiFi controller 110 is configured to determine the Socio VoWiFi metric for each of the nodes based on the plurality of socio parameters associated with each of the nodes and determine the performance of each of the nodes based on the Socio VoWiFi metric.

In another embodiment, in order to determine the performance of each of the nodes, the VoWiFi controller 110 is configured to determine the CLEH metric for each of the nodes based on the plurality of CLEH parameters and determine the performance of each of the nodes based on the CLEH metric.

After determining the performance of each of the nodes, the VoWiFi controller 110 is configured to detect that the performance of the first node 200a is less than a performance of the second node 200b and 300 from the plurality of nodes. Based on the detection, the VoWiFi controller 110 is configured to perform the handover from the first node 200a to the second node 200b and 300.

In another embodiment, in order to perform the handover, the VoWiFi controller 110 is configured to detect the Internet protocol security (IPSec) tunnel established between the electronic device 100 and the wireless interface associated with the first node 200a. Further, the VoWiFi controller 110 is configured to preserve the IPSec tunnel established between the electronic device 100 and the ePDG associated with the first node 200a for a time period. Further, the VoWiFi controller 110 is configured to perform the handover by switching from the first node 200a to the second node 200b and 300 by transferring the preserved IPSec tunnel from the wireless interface associated with the first node 200a to the wireless interface associated with the second node 200b and 300.

In another embodiment, the VoWiFi controller 110 is configured to detect the VoWiFi call between the electronic device 100 and the first node 200a from the plurality of nodes. After detection, the VoWiFi controller 110 is configured to determine that the handover from the first node 200a to the second node 200b from the plurality of nodes needs to be performed to avoid the VoWiFi call drop. Generally, the handover can be to a Wi-Fi AP 200b or to an LTE AP 300.

The handover of the electronic device 100 from the first node 200a to the second node 200b needs to be performed to avoid the VoWiFi call drop is determined by detecting the wireless connection between the electronic device 100 and the first node 200a from the plurality of nodes, determining the performance of each of the nodes, and detecting that the performance of the first node 200a is less than the performance of the second node 200b from the plurality of nodes.

After determination, the VoWiFi controller 110 is configured to perform the handover from the first node to the second node 200b without dropping the VoWiFi call.

The communication interface 120 is configured for communicating internally between internal hardware components and with external devices via one or more networks. The communication interface 120 is configured for communicating with the VoWiFi controller 110 to handle the wireless communication in the VoWiFi system 1000a and 1000b.

Further, the VoWiFi controller 110 executes a CLEH logic and decides the handover functionality with respect to the parameters and multiple factors. The VoWiFi controller 110 is configured to monitor the IMS registration state and retrieves the CLEH score of the running interfaces. Further, the VoWiFi controller 110 implements various logic to perform all IMS handovers and invokes the connectivity APIs for the route update procedure.

The VoWiFi controller 110 estimates the bandwidth of a particular interface and calculates the link capacity score with the same. This information is passed to the VoWiFi controller 110. Further, the VoWiFi controller 110 maintains data pertaining to RTP packet loss and round trip time to the IMS server in the current operational conditions and also the previous history. These parameters are used in CLEH score determination. Further, the VoWiFi controller 110 calculates the threshold bandwidth required for the IMS audio and video calls and reports the same to the electronic device 100.

Further, the VoWiFi controller 110 enables/disables the RSDB feature and background scanning/connection establishment/disconnection and bonds interface with the specific node and switches the active/backup interface.

Further, the VoWiFi controller 110 calculates interface score for the switching decisions and an active Radio Access Technology (RAT) information and connection state is obtained by listening for connectivity service broadcasts.

Further, the processor 140 which is configured to execute instructions stored in a memory 130 and to perform various processes. The memory 130 also stores instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory is non-movable. In some examples, the memory 130 can be configured to store larger amounts of information than the memory. In certain examples, a non-transitory storage medium may store data that can, over time, change (e.g., in Random Access Memory (RAM) or cache).

Similarly to the processor 140, the VoWiFi controller 110 may be implemented as a processor executing instructions from a memory. In some embodiments, the VoWiFi controller is a special-purpose hardware chip.

Although the FIG. 4 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the disclosure. One or more components can be combined together to perform same or substantially similar function to handle the wireless communication in the VoWiFi system 1000a and 1000b.

Figure 5:
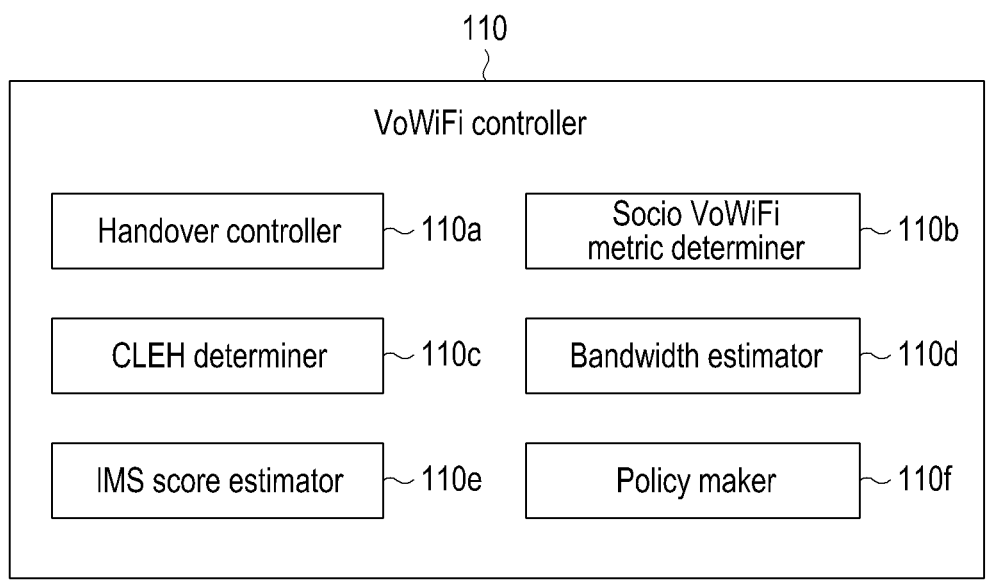
FIG. 5 is a block diagram of a VoWiFi controller included in the electronic device, according to an embodiment.

FIG. 5 is a block diagram of the VoWiFi controller 110 included in the electronic device 100, according to embodiments as disclosed herein. In an embodiment, the VoWiFi controller 110 includes a handover controller 110a, a Socio VoWiFi metric determiner 110b, a CLEH determiner 110c, a bandwidth estimator 110d, an IMS score estimator 110e and a policy maker 110f.

The handover controller 110a is configured to detect the wireless connection between the electronic device 100 and the first node 200a from the plurality of nodes. Further, the handover controller 110a is configured to determine the performance of each of the nodes.

In an embodiment, in order to determine the performance of each of the nodes, the Socio VoWiFi metric determiner 110*b* is configured to determine the Socio VoWiFi metric for each of the nodes based on the plurality of socio parameters associated with each of the nodes and determine the performance of each of the nodes based on the Socio VoWiFi metric.

In another embodiment, in order to determine the performance of each of the nodes, the CLEH determiner 110*c* is configured to determine the CLEH metric for each of the nodes based on the plurality of CLEH parameters and determine the performance of each of the nodes based on the CLEH metric.

After determining the performance of each of the nodes, the handover controller 110*a* is configured to detect that the performance of the first node 200*a* is less than a performance of the second node 200*b* from the plurality of nodes. Based on the detection, the handover controller 110*a* is configured to perform the handover from the first node 200*a* to the second node 200*b*. The handover is described to second node 200*b*. As an alternative embodiment, the handover can be to LTE AP 300.

In another embodiment, the handover controller 110*a* is configured to detect the VoWiFi call between the electronic device 100 and the first node 200*a* from the plurality of nodes. After detection, the handover controller 110*a* is configured to determine that the handover from the first node 200*a* to the second node 200*b* from the plurality of nodes needs to be performed to avoid the VoWiFi call drop.

The handover of the electronic device 100 from the first node 200*a* to the second node 200*b* needs to be performed to avoid the VoWiFi call drop is determined by detecting the wireless connection between the electronic device 100 and the first node 200*a* from the plurality of nodes, determining the performance of each of the nodes, and detecting that the performance of the first node 200*a* is less than the performance of the second node 200*b* from the plurality of nodes.

After determination, the handover controller 110*a* is configured to perform the handover from the first node to the second node 200*b* without dropping the VoWiFi call.

Further, the CLEH determiner 110*c* executes a CLEH logic and decides the handover functionality with respect to the parameters and multiple factors. The CLEH determiner 110*c* is configured to monitor the IMS registration state and retrieves the CLEH score of the running interfaces. Further, the CLEH determiner 110*c* implements various logic to perform all IMS handovers and invokes the connectivity APIs for the route update procedure.

The bandwidth estimator 110*d* estimates the bandwidth of a particular interface and calculates the link capacity score with the same. This information is passed to the CLEH determiner 110*c*.

The IMS score estimator 110*e* maintains data pertaining to RTP packet loss and round trip time to the IMS server in the current operational conditions and also the previous history. These parameters are used in CLEH score determination. The policy maker 110*f* calculates the threshold bandwidth required for the IMS audio and video calls and reports the same to the CLEH determiner 110*c*.

The handover controller 110*a* enables/disables the RSDB feature and background scanning/connection establishment/disconnection and bonds interface with the specific node and switches the active/backup interface. Further, the VoWiFi controller 110 includes a smart network switch (not shown) to calculates interface score for the switching decisions.

Although the FIG. 5 shows various hardware components of the VoWiFi controller 110 but it is to be understood that other embodiments are not limited thereon. In other embodiments, the VoWiFi controller 110 may include less or more number of components. Further, the labels or names of the components are used only for illustrative purpose and does not limit the scope of the disclosure. One or more components can be combined together to perform same or substantially similar function to handle the wireless communication in the VoWiFi system 1000.

Figure 6:
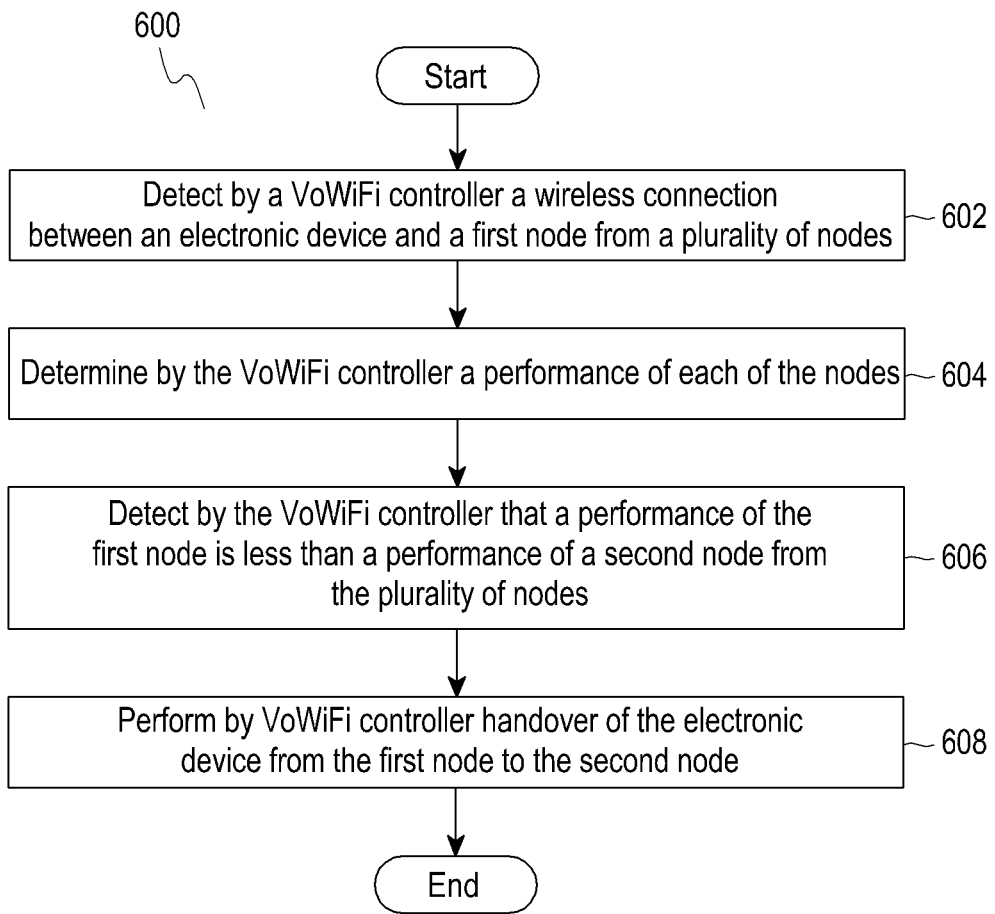
FIG. 6 is a flow diagram illustrating a method for performing the handover of the electronic device from the first node to the second node, according to an embodiment.

FIG. 6 is a flow diagram 600 illustrating a method for performing the handover of the electronic device 100 from the first node 200*a* to the second node 200*b* without dropping the VoWiFi call, according to embodiments as disclosed herein. The operations (602-608) are performed by the VoWiFi controller 110. Note that the handover can be to LTE AP 300 as an alternative to second node 200*b*.

At 602, the method includes detecting the wireless connection between the electronic device 100 and the first node 200*a* from the plurality of nodes. At 604, the method includes determining the performance of each of the nodes. At 606, the method includes detecting that the performance of the first node 200*a* is less than the performance of the second node 200*b* from the plurality of nodes. At 608, the method includes performing handover of the electronic device 100 from the first node 200*a* to the second node 200*b*.

The various actions, acts, blocks, steps, or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the disclosure.

Figure 7:
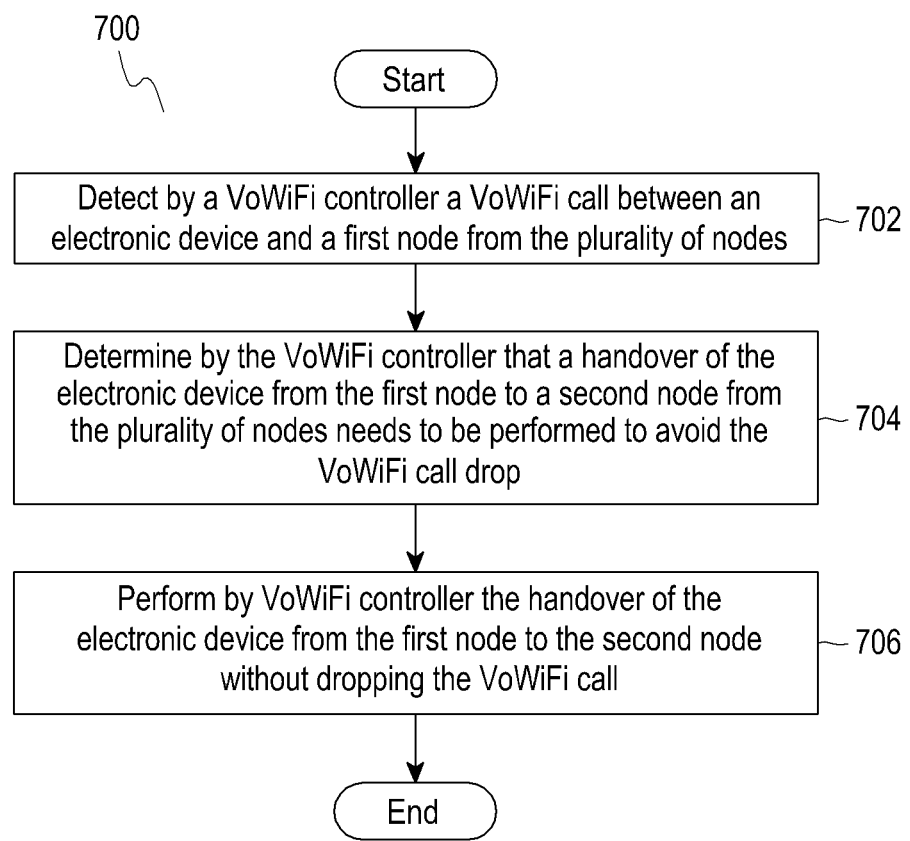
FIG. 7 is a flow diagram illustrating a method for performing the handover of the electronic device from the first node to the second node without dropping a VoWiFi call, according to an embodiment.

FIG. 7 is a flow diagram 700 illustrating a method for performing the handover of the electronic device 100 from the first node 200*a* to the second node 200*b* without dropping the VoWiFi call, according to embodiments as disclosed herein. The operations (702-706) are performed by the VoWiFi controller 110.

At 702, the method includes detecting the VoWiFi call between the electronic device 100 and the first node from the plurality of nodes. At 704, the method includes determining that the handover of the electronic device 100 from the first node 200*a* to the second node 200*b* from the plurality of nodes needs to be performed to avoid the VoWiFi call drop. At 706, the method includes performing the handover of the electronic device 100 from the first node 200*a* to the second node 200*b* and 300 without dropping the VoWiFi call.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the disclosure.

Figure 8:
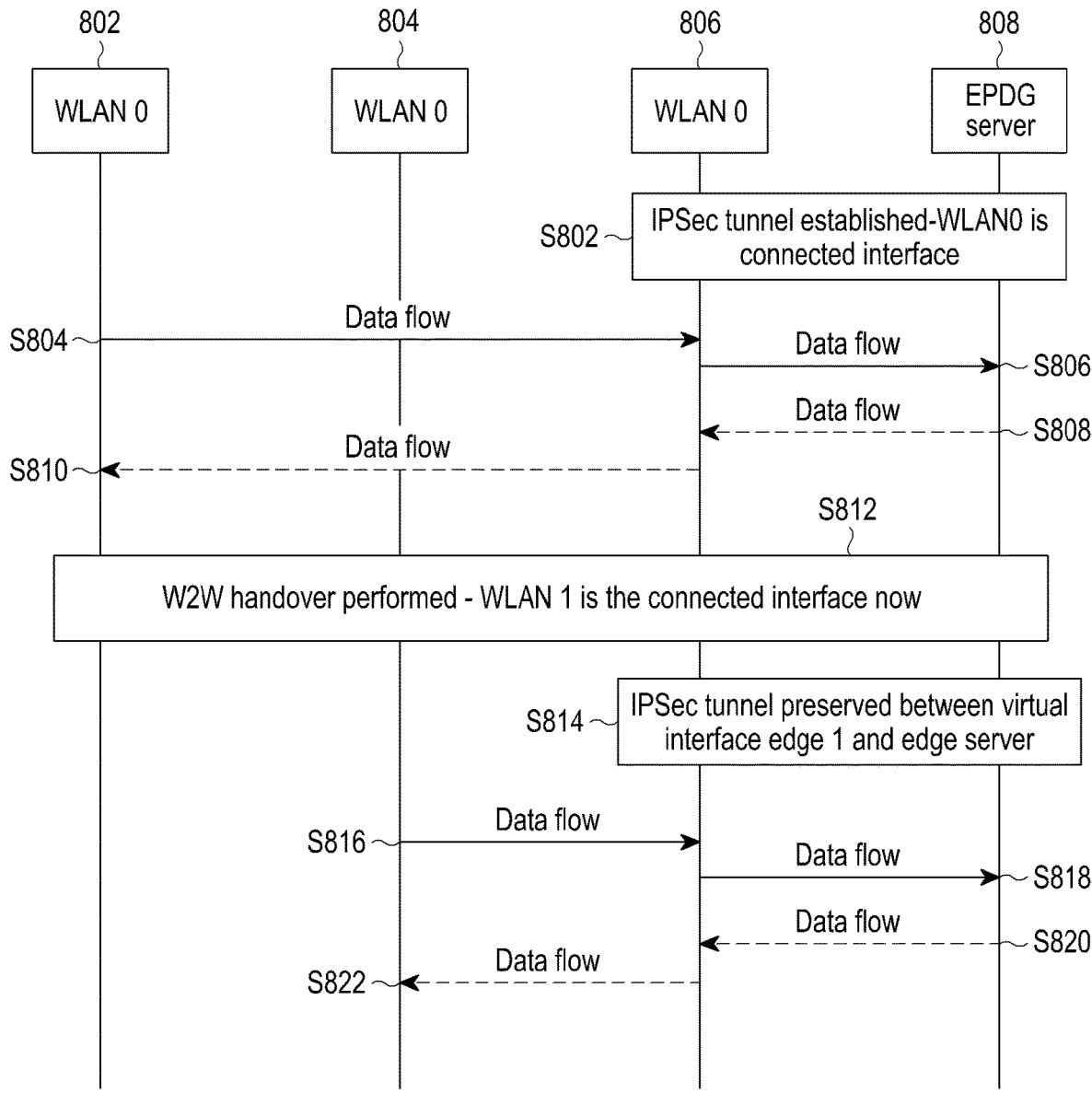
FIG. 8 is an example sequence flow diagram illustrating various operations for managing data flow by transferring a preserved IPSec tunnel from a wireless interface associated with a first node to a wireless interface associated with a second node, according to an embodiment.

FIG. 8 is an example sequence flow diagram illustrating various operations for managing the data flow by transferring the preserved IPSec tunnel from the wireless interface associated with the first node 200*a* to the wireless interface associated with the second node 200*b*, according to embodiments as disclosed herein.

For a WLAN0 connected interface, the IPSec tunnel is established (S802) between the EPDG 806 and an EPDG server (808). The WLAN0 802 sends (S804) a data flow to the EPDG 806. The EPDG 806 sends (S806) a data flow to the EPDG server 808. The EPDG server 808 sends (S808) a data flow to the EPDG 806. The EPDG 806 sends (S810) a data flow to the WLAN0 802.

Consider, the W2W handover is performed (S812) and WLAN 1 804 is the connected interface for the data flow. The IPSec tunnel is preserved (S814) between a virtual interface associated with the EDGE 806 and the EDGE server (808). The WLAN1 804 sends (S816) a data flow to the EPDG 806. The EPDG 806 sends (S818) a data flow to the EPDG server 808. The EPDG server 808 sends (S820) a data flow to the EPDG 806. The EPDG 806 sends (S822) a data flow to the WLAN1 804.

Figure 9:
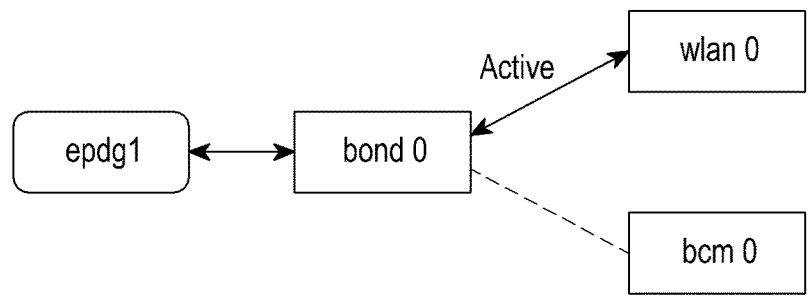
FIG. 9 illustrates an example bonding architecture, according to an embodiment.

FIG. 9 illustrates an example bonding architecture, according to embodiments as disclosed herein. In the bonding architecture, a virtual interface (epdg1), created by vpn client daemon, is encapsulated as ESP packets within the IPsec (Internet Protocol Security). These are encrypted and the keys are obtained using IKEv2 protocol. We have two Wi-Fi interfaces enabled by the RSDB (STA+STA mode). These interfaces are bonded to the bond0 interface and work in active-backup policy (Only one slave in the bond is active, and a different slave becomes active if, and only if, the active slave fails). The epdg1 tunnel is coupled to bond0 and sends packet to ePDG server by the active interface of bond. Based on the Socio VoWiFi metric or the CLEH metric, decision to perform handover in taken. L2W and W2L handovers are performed by invoking the corresponding ePDG API calls. To perform W2W handover, the VoWiFi controller 110 directly interacts with the Wi-Fi module which in turn requests native WLAN driver to change the active slave interface in created bond master-slave architecture.

In an embodiment, based on the Socio VoWiFi metric or the CLEH metric, the decision to perform handover in taken. The L2W and W2L handovers are performed using a legacy logic by invoking the corresponding ePDG module API calls. The IMS framework uses a VPN client to create the ePDG tunnel. To perform W2W handover, the CLEH determiner 110c and the Socio VoWiFi metric determiner 110b directly interact with the VoWiFi controller 110 which in turn request a native WLAN driver to change the active slave interface in a created bond master-slave architecture.

Figure 10:
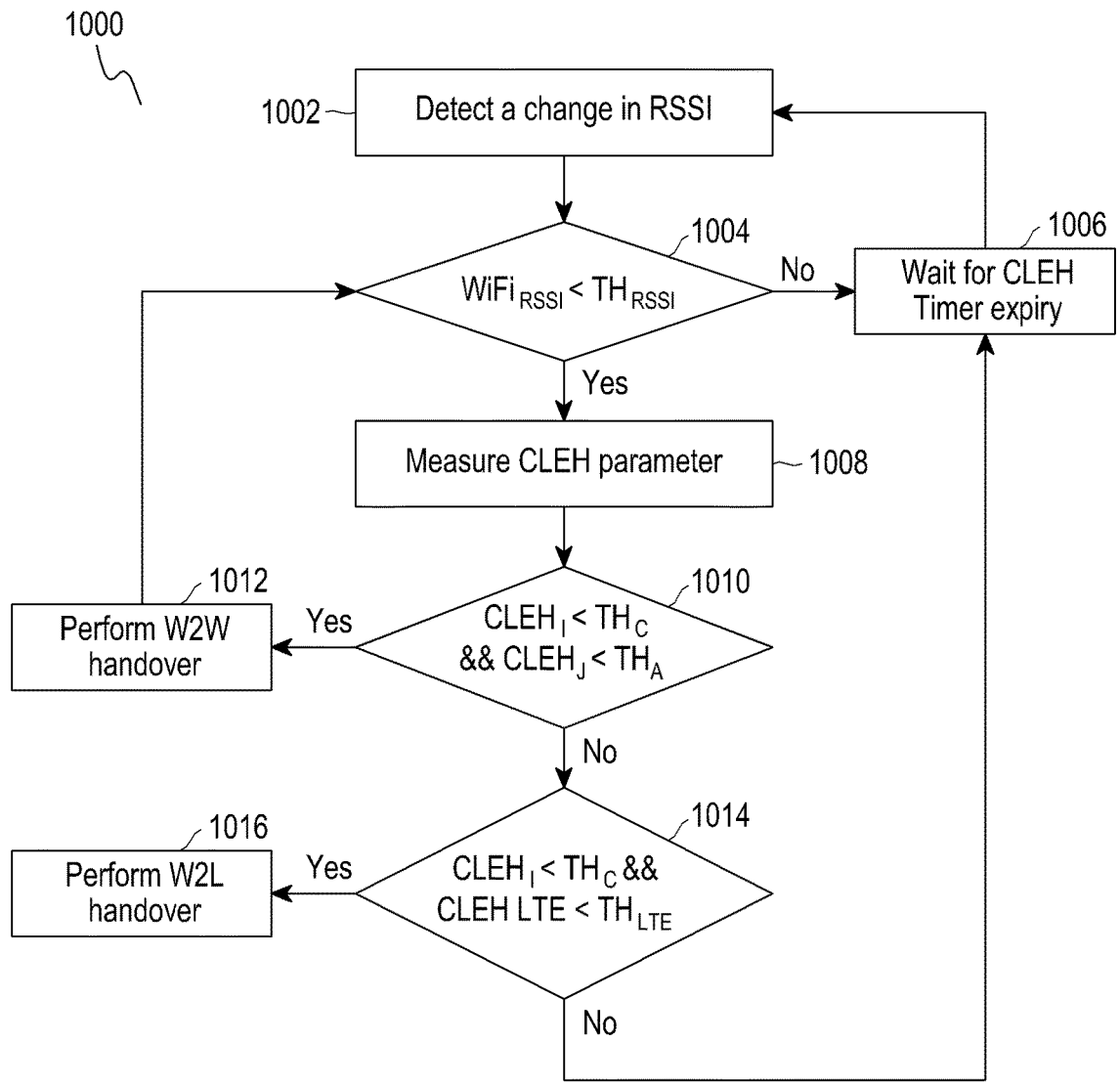
FIG. 10 is a flow diagram illustrating a method for performing a W2W handover and W2L handover from the first node to the second node based on a CLEH parameter, according to an embodiment.

FIG. 10 is a flow diagram 1000 illustrating a method for performing a W2W handover and W2L handover from the first node 200a to the second node 200b and 300 based on the CLEH parameter, according to embodiments as disclosed herein. The operations (1002-1016) are performed by the VoWiFi controller 110. Consider, the electronic device 100 establishes the VoWiFi call with the Wi-Fi AP using the VoWiFi controller 110.

At 1002, the method includes detecting a change in the RSSI. At 1004, the method includes determining that Wi-Fi RSSI falls below a threshold for Wi-Fi RSSI (i.e., Wi-Fi$_{RSSI}$<TH$_{RSSI}$). If the Wi-Fi RSSI falls below the threshold for Wi-Fi RSSI then, at 1006, the method includes measuring the CLEH parameter. If the Wi-Fi RSSI does not fall below the threshold for the Wi-Fi RSSI then, at 1008, the method includes waiting for CLEH timer expiry and again detecting the change in the RSSI.

At 1010, the method includes determining that the CLEH score for a connected Interface is less than the threshold CLEH score for connected interface and the CLEH score for available interface is less than the threshold CLEH score for connected interface.

If the CLEH score for the connected Interface is less than the threshold CLEH score for connected interface and the CLEH score for available interface is less than the threshold CLEH score for connected interface then at 1012, the method includes performing the W2W handover. The handover criteria should be satisfied for an epoch timer.

If the CLEH score for the connected interface is not less than the threshold CLEH score for the connected interface and the CLEH score for available interface is not less than the threshold CLEH score for connected interface then at 1014, the method includes determining that the CLEH score for the connected Interface is less than the threshold CLEH score for connected interface and the CLEH score for connected interface and the CLEH score for LTE is less than the threshold CLEH score for the LTE.

If the CLEH score for the connected interface is less than the threshold CLEH score for connected interface and the CLEH score for LTE is less than threshold CLEH score for LTE then, at 1016, the method includes performing the W2L handover. The handover criteria should be satisfied for the epoch timer.

If the CLEH score for the connected Interface is not less than the threshold CLEH score for connected interface and the CLEH score for LTE is not less than threshold CLEH score for LTE then at 1006, the method includes waiting for the CLEH timer expiry.

The various actions, acts, blocks, steps, or the like in the flow diagram 1000 may be performed in the order presented, in a different order or simultaneously. Further, in some embodiments, some of the actions, acts, blocks, steps, or the like may be omitted, added, modified, skipped, or the like without departing from the scope of the disclosure.

Figure 11:
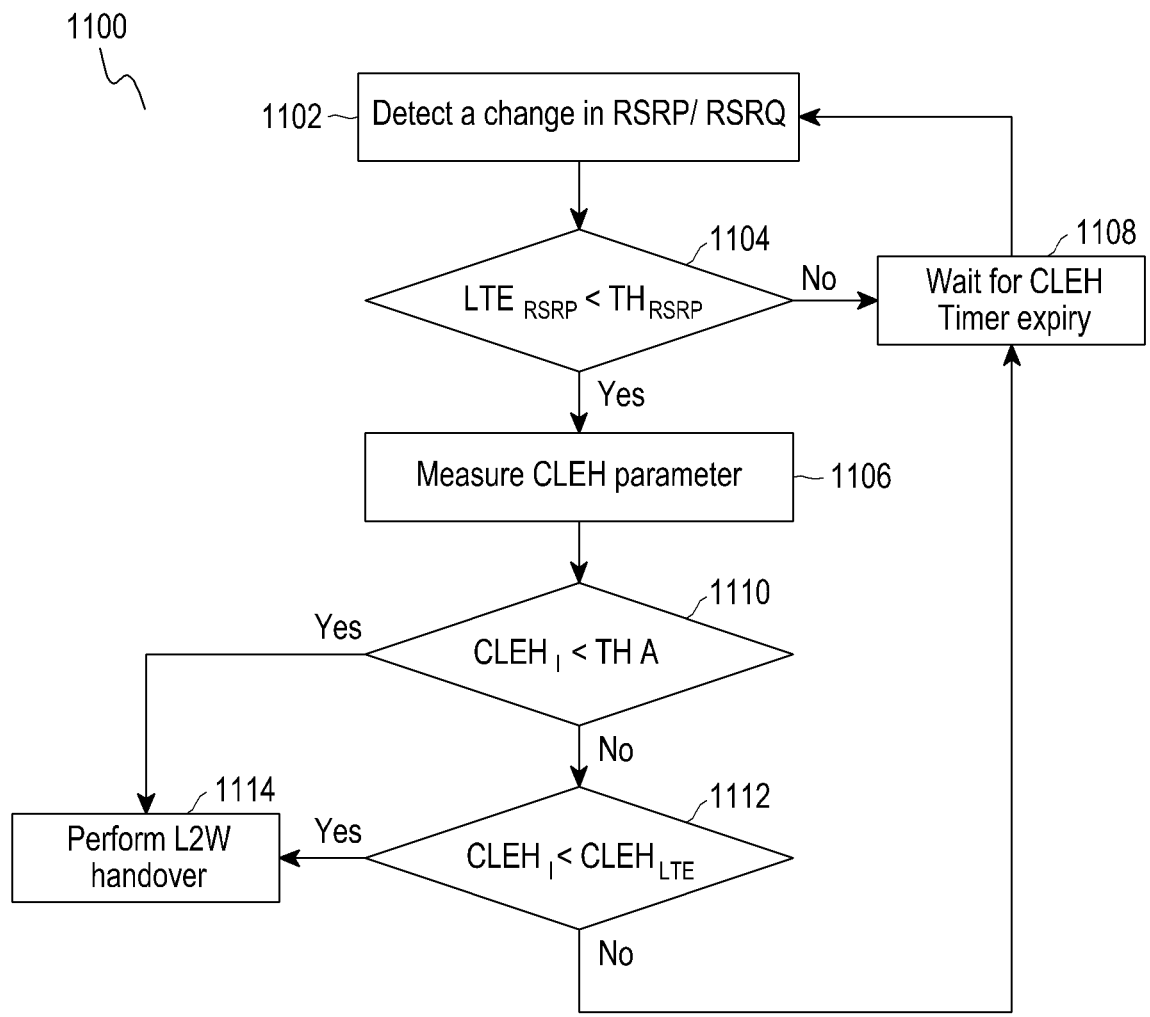
FIG. 11 is a flow diagram of a method for performing a L2W handover from the first node to the second node based on a CLEH parameter, according to an embodiment.

FIG. 11 is a flow diagram 1100 illustrating a method for performing a L2W handover from the first node to the second node 200b based on a CLEH parameter, according to embodiments as disclosed herein. Consider, the operations (1102-1114) are performed by the VoWiFi controller 110 and the electronic device 100 is connected with a VoLTE module.

At 1102, the method includes detecting a change in RSRP/RSRQ. At 1104, the method includes determining that current LTE RSRP is less that Threshold for LTE RSRP. If the current LTE RSRP is less that Threshold for LTE RSPP then, at 1106, the method includes measuring the CLEH parameter. If the current LTE RSRP is not less that threshold for LTE RSPP then, at 1108, the method includes waiting for the CLEH timer expiry and again detecting the change in RSRP/RSRQ.

At 1110, the method includes determining that the CLEH score for available Wi-Fi Interface is less than the threshold CLEH score for Wi-Fi available interface. If the CLEH score for available Wi-Fi Interface is less that Threshold CLEH score for W-Fi available interface then, at 1114, the method includes performing L2W handover. The handover condition is satisfied for epoch timer.

If the CLEH score for available Wi-Fi Interface is not less that Threshold CLEH score for Wi-Fi available interface then, at 1112, the method includes the CLEH score for available Wi-Fi Interface is less that the CLEH score for LTE.

If the CLEH score for available Wi-Fi Interface is less that the CLEH score for LTE then, at 1114, the method includes performing L2W handover. The handover condition is satisfied for epoch timer. If the CLEH score for available Wi-Fi Interface is not less that the CLEH score for LTE then, at 1108, the method includes waiting for the CLEH Timer expiry.

The various actions, acts, blocks, steps, or the like in the flow diagram 1100 may be performed in the order presented, in a different order or simultaneously. Further, in some embodiments, some of the actions, acts, blocks, steps, or the like may be omitted, added, modified, skipped, or the like without departing from the scope of the disclosure.

Figure 12:
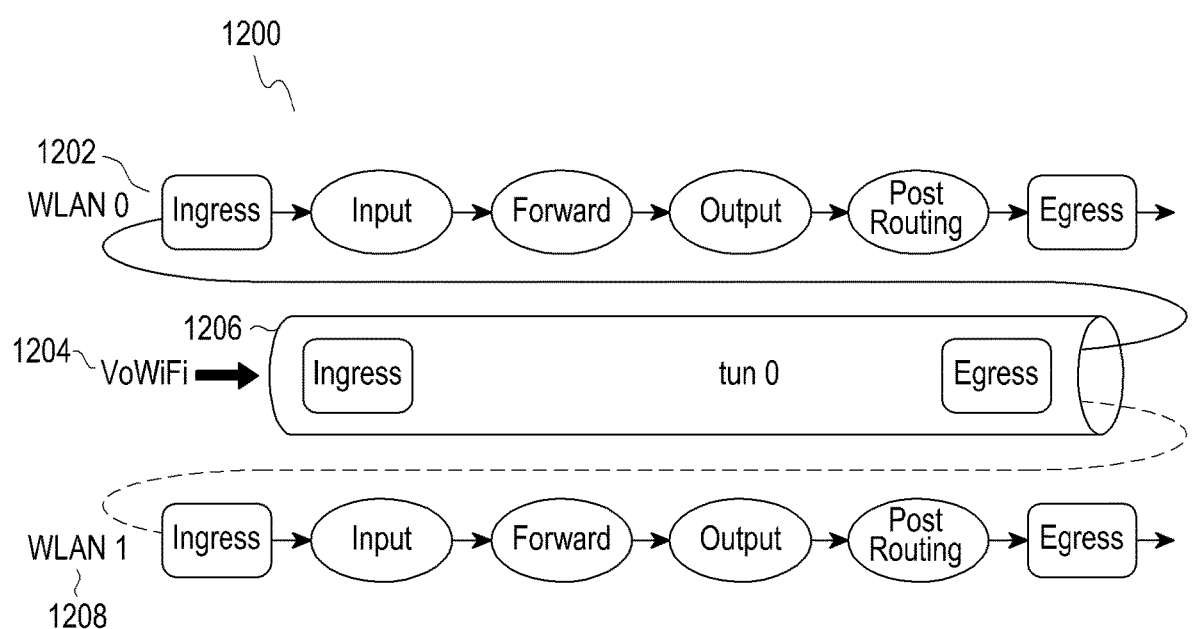
FIG. 12 illustrates a packet flow diagram while transferring the preserved IPSec tunnel from the wireless interface associated with the first node to the wireless interface associated with the second node, according to an embodiment.

FIG. 12 illustrates a packet flow diagram 1200 while transferring the preserved IPSec tunnel from the wireless interface associated with the first node 200a to the wireless interface associated with the second node 200b and 300, according to embodiments as disclosed herein. The VoWiFi packets 1204, is tightly coupled with the bonded or the tunnel interface tun0 1206. The tun0 has been bonded with a Wi-Fi interface wlan0 1202 and a Wi-Fi interface wlan1 1208. While the Wi-Fi interface wlan0 1202 is active, the Wi-Fi interface wlan1 1208 is made as back-up and vice versa.

The embodiments disclosed herein can be implemented through at least one software program running on at least one hardware device and performing network management functions to control the elements.

According to an embodiment of the disclosure, a method for handling a wireless communication in a Voice over Wireless Fidelity (VoWiFi) system comprising a plurality of nodes is provided. The method includes detecting, by a VoWiFi controller, a wireless connection between an electronic device and a first node from among the plurality of nodes; determining, by the VoWiFi controller, a performance of each of the plurality of nodes; detecting, by the VoWiFi controller, that a first performance of the first node is less than a second performance of a second node from among the plurality of nodes; and performing, by the VoWiFi controller, a handover of the electronic device from the first node to the second node.

Herein, the performing the handover of the electronic device from the first node to the second node comprises: detecting an Internet protocol security (IPSec) tunnel between the electronic device and a wireless interface associated with the first node; preserving the IPSec tunnel for a time period; and performing the handover by switching the electronic device from the first node to the second node by transferring the preserved IPSec tunnel from the wireless interface associated with the first node to a wireless interface associated with the second node.

Herein, the preserved IPSec tunnel is transferred from the wireless interface associated with the first node to the wireless interface associated with the second node using routing commands.

Herein, the wireless interface associated with the first node is bounded to the wireless interface associated with the second node based on a Real-simultaneous dual-band (RSDB).

Herein, the first node is a Wi-Fi access point and the second node is a second Wi-Fi access point.

Herein, the first node is a Wi-Fi access point and the second node is a Long Term Evolution (LTE) access point.

Herein, the determining the performance of each of the plurality of nodes comprises: determining a socio VoWiFi metric for each of the plurality of nodes based on a plurality of socio parameters associated with each of the plurality of nodes; and determining the performance of each of the plurality of nodes based on the socio VoWiFi metric.

Herein, the plurality of socio parameters comprises social activities, connection status, quality parameters, and a growth poll period.

Herein, the social activities comprise time of user activity, and location of user activity.

Herein, the determining the performance of each of the plurality of nodes comprises: determining a Cross Layer Enhanced Handover (CLEH) metric for each of the plurality of nodes based on a plurality of CLEH parameters; and determining the performance of each of the plurality of nodes based on the CLEH metric.

Herein, the plurality of CLEH parameters comprises at least one of a WiFi Received Signal Strength Indicator (RSSI), a Long Term Evolution (LTE) Reference Signal Received Power (RSRP), Reference Signal Received Quality (RSRQ), and an Internet Protocol (IP) Multimedia Subsystem (IMS) registration state.

According to an embodiment of the disclosure, a method for handling a wireless communication in a Voice over Wireless Fidelity (VoWiFi) system comprising a plurality of nodes is provided. The method includes detecting, by a VoWiFi controller, a VoWiFi call between an electronic device and a first node from among the plurality of nodes; determining, by the VoWiFi controller, that a handover of the electronic device from the first node to a second node from among the plurality of nodes needs to be performed to avoid dropping the VoWiFi call; and performing, by the VoWiFi controller, the handover of the electronic device from the first node to the second node.

Herein, the determining comprises: determining a performance of each of the plurality of nodes; and detecting that a performance of the first node is less than a performance of the second node.

Herein, the performing the handover comprises: detecting an Internet protocol security (IPSec) tunnel between the electronic device and a wireless interface associated with the first node; preserving the IPSec tunnel for a time period; and performing the handover by switching the electronic device from the first node to the second node by transferring the preserved IPSec tunnel from the wireless interface associated with the first node to a wireless interface associated with the second node.

Herein, the preserved IPSec tunnel is transferred from the wireless interface associated with the first node to the wireless interface associated with the second node using routing commands.

Herein, the wireless interface associated with the first node is bounded to the wireless interface associated with the second node based on a Real-simultaneous dual-band (RSDB).

Herein, the determining the performance of each of the plurality of nodes comprises: determining a Socio VoWiFi metric for each of the plurality of nodes based on a plurality of socio parameters associated with each of the plurality of nodes; and determining the performance of each of the plurality of nodes based on the Socio VoWiFi metric.

Herein, the plurality of socio parameters comprises social activities, connection status, quality parameters, and a growth poll period.

Herein, the social activities comprise time of user activity, and location of user activity.

Herein, the determining the performance of each of the plurality of nodes comprises: determining a Cross Layer Enhanced Handover (CLEH) metric for each of the plurality of nodes based on a plurality of CLEH parameters; and determining the performance of each of the plurality of nodes based on the CLEH metric.

Herein, the plurality of CLEH parameters comprises at least one of a Wi-Fi Received Signal Strength Indicator (RSSI), a Long Term Evolution (LTE) Reference Signal Received Power (RSRP), Reference Signal Received Quality (RSRQ), and an Internet Protocol (IP) Multimedia Subsystem (IMS) registration state.

While various example embodiments have been described herein, it will be understood by those of ordinary skill in the art that various changes in form and details may be made therein without departing from the spirit and scope of the present disclosure as defined by the following claims.

What is claimed is:

1. An electronic device for handling a wireless communication in a Voice over Wireless Fidelity (VoWiFi) system comprising a plurality of nodes, the electronic device comprising:
   a memory;
   a transceiver; and
   a processor coupled to the memory and the transceiver, wherein the processor is configured to:
      detect a connection between the electronic device and a first node from among the plurality of nodes,
      determine a performance of each of the plurality of nodes,
      detect that a first performance of the first node is less than a second performance of a second node from among the plurality of nodes, and
      perform a handover of the electronic device from the first node to the second node by transferring an internet protocol security (IPSec) tunnel from a first interface associated with the first node to a second interface associated with the second node.

2. The electronic device of claim 1, wherein the processor is further configured to perform the handover by:
   detecting (the IPSec) tunnel between the electronic device and the first interface associated with the first node; and
   preserving the IPSec tunnel for a time period.

3. The electronic device of claim 2, wherein the processor is further configured to use routing commands to transfer the IPSec tunnel from the first interface associated with the first node to the second interface associated with the second node.

4. The electronic device of claim 2, wherein the first interface associated with the first node is bounded to the second interface associated with the second node based on a Real-simultaneous dual-band (RSDB).

5. The electronic device of claim 1, wherein the first node is a first Wi-Fi access point and the second node is a second Wi-Fi access point.

6. The electronic device of claim 1, wherein the processor is further configured to determine the performance of each of the plurality of nodes by:
   determining a Socio VoWiFi metric for each of the plurality of nodes based on a plurality of socio parameters associated with each of the plurality of nodes; and
   determining the performance of each of the plurality of nodes based on the Socio VoWiFi metric.

7. The electronic device of claim 6, wherein the plurality of socio parameters comprises social activities, a connection status, quality parameters, and a growth poll period.

8. The electronic device of claim 7, wherein the social activities comprise a time of user activity, and a location of user activity.

9. The electronic device of claim 1, wherein the processor is further configured to determine the performance of each of the plurality of nodes by:
   determining a Cross Layer Enhanced Handover (CLEH) metric for each of the plurality of nodes based on a plurality of CLEH parameters; and
   determining the performance of each of the plurality of nodes based on the CLEH metric.

10. The electronic device of claim 9, wherein the plurality of CLEH parameters comprises at least one of a Wi-Fi Received Signal Strength Indicator (RSSI), a Long Term Evolution (LTE Reference Signal Received Power (RSRP), Reference Signal Received Quality (RSRQ), and an Internet Protocol (IP) Multimedia Subsystem (IMS) registration state.

11. A method for handling a wireless communication in a Voice over Wireless Fidelity (VoWiFi) system comprising a plurality of nodes, the method comprising:
   detecting a connection between an electronic device and a first node from among the plurality of nodes,
   determining a performance of each of the plurality of nodes;
   detecting that a first performance of the first node is less than a second performance of a second node from among the plurality of nodes, and
   performing the handover of the electronic device from the first node to the second node by transferring an internet protocol security (IPSec) tunnel from a first interface associated with the first node to a second interface associated with the second node.

12. The method of claim 11, wherein the performing the handover further comprises:
   detecting the (IPSec) tunnel between the electronic device and the first interface associated with the first node; and
   preserving the IPSec tunnel for a time period.

13. The method of claim 12, wherein the performing the handover further comprises:
   transferring the IPSec tunnel using routing commands.

14. The method of claim 12, wherein the first interface associated with the first node is bounded to the second interface associated with the second node based on a Real-simultaneous dual-band (RSDB).

15. The method of claim 11, further comprises:
   determining a Socio VoWiFi metric for each of the plurality of nodes based on a plurality of socio parameters associated with each of the plurality of nodes; and
   determining the performance of each of the plurality of nodes based on the Socio VoWiFi metric.

16. The method of claim 15, wherein the plurality of socio parameters comprises social activities, a connection status, quality parameters, and a growth poll period.

17. The method of claim 16, wherein the social activities comprise a time of user activity and a location of user activity.

18. The method of claim 11, wherein the determining the performance of each of the plurality of nodes comprises:
   determining a Cross Layer Enhanced Handover (CLEH) metric for each of the plurality of nodes based on a plurality of CLEH parameters; and
   determining the performance of each of the plurality of nodes based on the CLEH metric.

* * * * *